United States Patent [19]
Addy

[11] Patent Number: 5,822,373
[45] Date of Patent: Oct. 13, 1998

[54] METHOD AND APPARATUS FOR OPTIMIZATION OF WIRELESS COMMUNICATIONS

[75] Inventor: Kenneth Lyle Addy, Massapequa, N.Y.

[73] Assignee: Pittway Corporation, Chicago, Ill.

[21] Appl. No.: 516,162

[22] Filed: Aug. 17, 1995

[51] Int. Cl.[6] .............................. H04L 27/04; H04L 27/06
[52] U.S. Cl. ........................ 375/259; 375/312; 375/344
[58] Field of Search .................... 375/259, 295, 375/309, 311, 344, 300; 332/149, 150; 455/78, 108, 150.1, 343, 161.1, 164.1, 192.2

[56] References Cited

U.S. PATENT DOCUMENTS

| | | | |
|---|---|---|---|
| 3,730,998 | 5/1973 | Schmidt et al. | 178/69.5 R |
| 4,485,478 | 11/1984 | Takada | 375/60 |
| 4,631,736 | 12/1986 | Yamanoue et al. | 375/71 |
| 5,196,806 | 3/1993 | Ichihara | 330/137 |

OTHER PUBLICATIONS

Stallings, Data and Computer COmmunications, p. 810., 1994.

*Primary Examiner*—Chi H. Pham
*Assistant Examiner*—William Luther
*Attorney, Agent, or Firm*—Anthony R. Barkume, P.C.

[57] ABSTRACT

A unique wireless transmission signal structure has a preamble at a first data rate and a data portion including the base band signal at a second, higher data rate. The signal is generated in a manner which ensures that the transmitted signal is "on" no more than one half the entire transmission time. A unique wireless transmitter generates the inventive transmission signal. A crystal oscillator drives both a signal generation circuit and a frequency generator. This provides accurate timing and allows the transmission signal to be not self-clocked. A unique wireless transmission receiver has adjustable pre-detection and post-detection filters. When the receiver is scanning for an incoming transmission signal, the pre-detection filter has a wide bandwidth to receive incoming transmission signals within a predictable range of variations due to inaccuracies in the transmitter and receiver. At this time, the post-detection filter has a narrow bandwidth to pass the low bit rate preamble data and reject noise. When a preamble has been detected, the incoming signal is "locked onto" and the pre-detection filter is adjusted to a narrow bandwidth which reject signals other than the incoming signal. The post-detection filter is switched to a wide bandwidth to accept the higher data rate data/CRC portion of the signal. This arrangement allows the transmitter to be relatively inexpensive and to transmit efficiently maintaining short on air time yet the receiver may be selected and sensitive.

32 Claims, 9 Drawing Sheets

METHOD AND APPARATUS FOR OPTIMIZATION OF WIRELESS COMMUNICATIONS

FIELD OF THE INVENTION

The present invention is directed to a method and apparatus for wireless transmission and, more particularly, to a method and an apparatus which optimize the transmission requirements for license exempt, secondary frequency wireless transmissions imposed by 47 CFR §15.

BACKGROUND OF THE INVENTION

Wireless transmissions in the United States are regulated by the Federal government. Agencies outside of the United States regulate wireless transmissions, as well. For example, wireless transmissions in Europe are regulated by such agencies as European Telecom Standards Institute (ETSI) and other national agencies. In the United States, the Federal Communications Commission ("FCC") has issued federal regulations affecting wireless data transmissions. These regulations are found in the Code of Federal Regulations, Title 47, Part 15 (47 CFR §15 et. seq.).

The FCC has allocated frequency bands for certain types of wireless transmissions. These frequency bands may be either "licensed" or "license exempt". If a wireless transmitter is designed to transmit within a frequency for which a license is required (a "licensed frequency"), the operator of the wireless equipment must pay the government a license fee for each radio installed. If a wireless transmitter is designed to transmit within a frequency for which no license is required (a "license exempt frequency"), no license fee is required. For wireless transmission applications having a large number of transmitters, or where the overall wireless information system is inexpensive, the license fee is prohibitively expensive for a commercially competitive product.

The FCC has also designated wireless transmissions as either a primary or a secondary user of a frequency. A primary user of a frequency is one which the FCC protects from interference by other transmissions. One example is an airport's instrument landing system transmissions. Because these transmissions guide airplanes to safe landings, they are protected from interference by not allowing other transmissions on the delegated frequency band. Secondary users of frequencies do not enjoy this protection from interference. Secondary frequencies include, for example, frequencies for garage door openers and remote controls. These systems do not involve the same safety considerations which necessitate FCC protection.

The FCC imposes several constraints on license exempt, secondary transmissions. Federal regulations require that the transmission's maximum field strength be calculated as the average field strength over a complete pulse train, provided that the pulse train does not exceed 100 ms. If the pulse train exceeds 100 ms, the field strength is determined as the average absolute voltage over 100 ms.

If the emissions are pulsed, rather than constant, the emissions may be transmitted in less than 100 ms, rather than spread out over the entire 100 ms. Because the field strength of pulsed emissions are measured as an average over a 100 ms period, the field strength transmitted during this time may be greater than that which may be transmitted if sent by a constant signal over the entire 100 ms period. For example, if a pulsed signal train is "on the air" for only 50 ms of the 100 ms period, it may be transmitted with double the maximum field strength of a constant signal. The FCC limits the transmission of the total allowed power to no less than 10% of the allotted time (i.e., no less than 10 ms). That is, the peak power cannot exceed one hundred times the average allowed power over the entire 100 ms period.

These parameters create an incentive to reduce the transmission "on time" to as small as possible (down to 10 ms) to allow for greater transmission power than if the signal was "on" for the entire 100 ms period.

For this reason, certain transmission types are preferred over others for license exempt, secondary transmission applications. For example, frequency modulation (FM) signals are not preferred because they are constantly "on". On-off-keyed amplitude modulation (OOK-AM) is often preferred because the signal is off except when data is being transmitted (i.e., not unlike Morse code), and it is inexpensive and simple to implement. Commonly used encoding schemes include pulse position modulation (PPM) (where the position of a pulse in a self-clocked signal conveys data) and biphase Manchester (where the transition of a signal from one value to another within a bit interval conveys data and the clock).

Constant carrier signals (i.e., constantly "on") are not preferred because when they are compared to, for example OOK-AM, the constant carrier signal cannot take as much advantage of peak to average power ratio calculation. For example, a Manchester encoded OOK-AM signal containing 10 bits of information will be on no more than 50% of the on-air time. Thus, the transmission can occupy 20 ms and will have an average "on time" of 10% of the FCC's average period. On the other hand, a constant carrier FM signal can occupy only 10 ms durations in order to satisfy the FCC averaging period. Therefore, to transmit 10 bits of information, the amplitude modulation can be sent at 10 bits/20 ms=500 Hz data rate, whereas the constant carrier signal must be sent at 10 bits/10 ms=1 KHz in order to take advantage of the full FCC 10% averaging. Because the FM data rate is higher, the receiver bandwidths must be wider thus compromising the receiver sensitivity and selectivity.

The PPM and biphase Manchester techniques are often preferred because they efficiently use the power/time (duty cycle) constraints and because they are self clocking (i.e., the techniques transmit a synchronization pulse or edge from which the position of the data pulse is compared). Self-clocking signals are often preferred because the data timing in the inexpensive transmitters is often poor and therefore self clocking signals are necessary for the receiver or decoder to operate satisfactorily.

Another technique, the non-return-to-zero (NRZ) technique, transmits digital information, and is only "on" (i.e., it only transmits) when the digital signal is a logical "1". This technique is quite efficient and can operate at less than half the data rate of the PPM or biphase Manchester techniques for equal information transfer. This is because, for example, with the biphase Manchester technique, each bit-cell is divided by 2 to provide the transitions. PPM requires two or more bit cells to convey information depending on the number of possible pulse positions. The NRZ information is conveyed in a single bit-cell, thus, the bit rate equals the baud rate because each bit is equal to the clock rate. However, the NRZ technique duty cycle is entirely dependent on the data content. This means that the more "1s" contained in the digital data signal, the more "on-air" time needed to transmit the signal. Thus, it is at least equally likely that there will be more than 50% "1s". An NRZ signal may not be able to take advantage of the peak-to-average-power ratio because it will be "on air" for more than the minimum regulatory averaging period, reducing the power which may be used to transmit the signal. Also NRZ is not self clocking. For these reasons, NRZ has not previously been preferred for use in prior license exempt, secondary wireless transmission systems.

The government and commercial constraints placed on license exempt bands impose conflicting requirements for this type of system. The relatively low power level permitted requires (1) as short a transmission "on time" as possible, and (2) a highly sensitive receiver to reliably detect the transmissions at a reasonable distance. The license exempt bands are secondary frequency bands, which have a higher likelihood of interference from other applications in the same band (i.e., the band is not protected from interference) . Thus, the receiver must also be highly selective to avoid unwanted interference.

The need for good selectivity and sensitivity means that the receiver must have a relatively narrow bandwidth. A narrow bandwidth receiver requires data transmitted at a low data rate. A low data rate, however, conflicts with the transmission time limitations. Increasing the transmitter message length causes an undesirable reduction in a transmitter's battery lifetime and also conflicts with the FCC's "on-air time" restrictions. The increased message length also increases the likelihood of signal contention, or "clash", with other transmitters in the unlicensed frequency band transmitting at approximately the same time. Finally, for reasons discussed below, many of the license exempt wireless data transmission applications require a cost effective (inexpensive) transmitter design. Thus, the transmitter often is made of low cost frequency control circuits which operate at a sub-optimum level. Thus, the frequency of the transmitted signals may fluctuate. This frequency fluctuation requires a receiver to have a large bandwidth to detect the transmission. This conflicts with the requirement for a sensitive and selective receiver.

Also, because many transmitters are portable, and the installation of fixed transmitters may not be practical or even possible in some applications, it is important to ensure that the system is protected from the effects of multi-path fading. Multi-path fading is destructive interference caused by a transmitted signal which travels several paths (i.e., is reflected or bounced off of several surfaces) which attenuate or cancel each other when they arrive at the receiver. Known solutions to the multi-path problem are achieved by introducing diversity into the system. For example, spatial diversity may be added by transmitting or receiving using one or more antennas that are spaced apart. Frequency diversity may be added by transmitting and/or receiving at more than one frequency. Temporal diversity may be achieved by repeating the message in two or more distinct time slots. Polarization diversity may be added by transmitting and/or receiving with two or more independent, orthogonal antennas.

All of these solutions to the multi-path problem have the undesirable result of longer transmission times in order to allow the receiver sufficient time to sample both antennas, both frequencies, or both time windows. As noted above, longer transmission times are undesirable because of the "on air" restrictions, and because they do not efficiently conserve battery power. Thus, it is desirable to reduce the transmission times to reduce the undesirable effects created by multi-path solutions.

There are many wireless data transmission applications which are designated for license exempt, secondary frequencies. Many of these uses involve a large number of transmitters and fewer receivers. Several examples are: water or gas meter reading devices where the meters transmit their current readings; factory instruments which transmit a number of measurements to a central location; automobile dealers that inventory each car on a lot; retail outlets that use UPC laser readers which transmit the readings to a central computer for inventory or other purposes; wireless security systems (such as burglar alarms) which transmit status and alarm information to a central detector or to a transceiver or hardwired system; and other wireless telemetry or wireless control uses. Because these applications require many transmitters, one of the primary design goals for these wireless data transmission systems is an inexpensive transmitter. Because portable transmitters are typically battery operated, it is also desirable to reduce the "on time" to conserve battery power.

A person skilled in the art recognizes that there are many uses for a wireless data transmission system. FIG. 1 illustrates one use for a license exempt wireless data transmission system. A building 20, such as a residence, has four stories: a basement 22, first 24 and second floors 26, and an attic 28. The building 20 has a wireless security system installed. The wireless security system includes a number of sensory devices. For example, each floor has a smoke detector 30 installed. The first 24 and second 26 floors have motion detectors 32 for detecting motion on these floors when, for example, the residents are not in the building. The front door 34 has an alarm device 36 to indicate if the door has been opened.

The wireless security system has a main panel 38 installed in an unobtrusive location, such as the basement 22. This main panel includes the security system control circuits and is connected to the building's outside telephone line 40 to report an alarm condition to a remote central station (not shown).

Each sensory device (e.g., smoke detectors 30, motion detectors 32, and alarm device 36) has a wireless transmitter 50 which is in wireless communication with a receiver 52. The sensory devices 30, 32, 36 may transmit wireless data signals to the main panel 38 to, for example, indicate status or report an alarm condition. This wireless arrangement allows sensory devices to be installed in various locations around the building 20 without running wires throughout the building to connect the devices to the main panel 38. This makes alarm systems easier to install and less obtrusive to the residents.

Regulatory and economic constraints on the transmission of license exempt, secondary wireless data impose unique and opposing design considerations for systems. Thus, it is an object of the present invention to provide a wireless data transmission method and apparatus which optimizes the transmission and reception of wireless data in light of these considerations.

It is a further object of the present invention to provide a highly reliable wireless data transmission system.

It is another object of the present invention to provide an encoding/decoding scheme which minimizes message length while maintaining a low data rate.

It is yet another object of the invention to provide an encoding/decoding scheme which maximizes the transmitted peak-to-average power ratio, while maintaining a low data rate and which complies with government transmitter timing restrictions.

It is an even further object of the present invention to provide an encoding/decoding scheme having inherently highly accurate timing which does not require a clock recovery method.

It is yet another object of the present invention to provide a wireless data system having a system bandwidth which matches the incoming digital message.

SUMMARY OF THE INVENTION

These and other objects of the present invention are achieved by the method and apparatus according to the present invention. The present invention comprises a unique wireless transmission structure, a unique wireless transmitter, and a unique wireless transmission receiver.

The inventive signal structure comprises a signal having a preamble at a first data rate and a data portion including a base band signal at a second, higher data rate. The signal is generated in a manner which ensures that the transmitted signal is "on" no more than one half the entire signal transmission time. In a preferred embodiment, the signal is an OOK-AM modulated signal.

The preamble preferably allows the receiver to "lock onto" the transmission frequency and to determine the signal strength of the incoming transmission. In a preferred embodiment, the preamble portion of the signal comprises a training sequence and a starting sequence. The training sequence is a sequence a receiver will detect as an incoming signal. The starting sequence indicates to the receiver that data follows.

In a preferred embodiment, the data portion includes a data sequence, which may be a baseband NRZ signal, and a cyclical redundancy check (CRC) sequence, which the receiver uses to check the integrity of the data sequence. The data portion is generated so that the transmission "on" time does not exceed half of the total transmission time.

The inventive transmitter generates the inventive transmission signal. A crystal oscillator drives both a signal generation circuit and a frequency generator. This provides accurate timing and allows the transmission signal to be not self-clocked. Preferably, the frequency generator is a variable frequency generator which provides a plurality of transmission frequencies. This allows the transmitter to transmit the signal at a plurality of frequencies, thus overcoming multipath fading and transmission "clash" problems.

The inventive receiver has adjustable pre-detection and post-detection filters. When the receiver is scanning for an incoming transmission signal, the pre-detection filter has a wide bandwidth to receive incoming transmission signals within a predictable range of variations. At this time, the post-detection filter has a narrow bandwidth to pass the low bit rate preamble data and reject noise. When a preamble has been detected, the incoming signal is "locked onto" and the pre-detection filter is adjusted to a narrow bandwidth which rejects signals other than the incoming signal. The post-detection filter is switched to a wide bandwidth to accept the higher data rate data/CRC portion of the signal. This arrangement allows the transmitter to be relatively inexpensive yet the receiver may be selective and sensitive and minimizes the transmission "on air" time.

BRIEF DESCRIPTION OF THE DRAWINGS

The present invention is described with reference to the following figures.

DETAILED DESCRIPTION OF A PREFERRED EMBODIMENT

A. The Signal Structure

Figure 2:
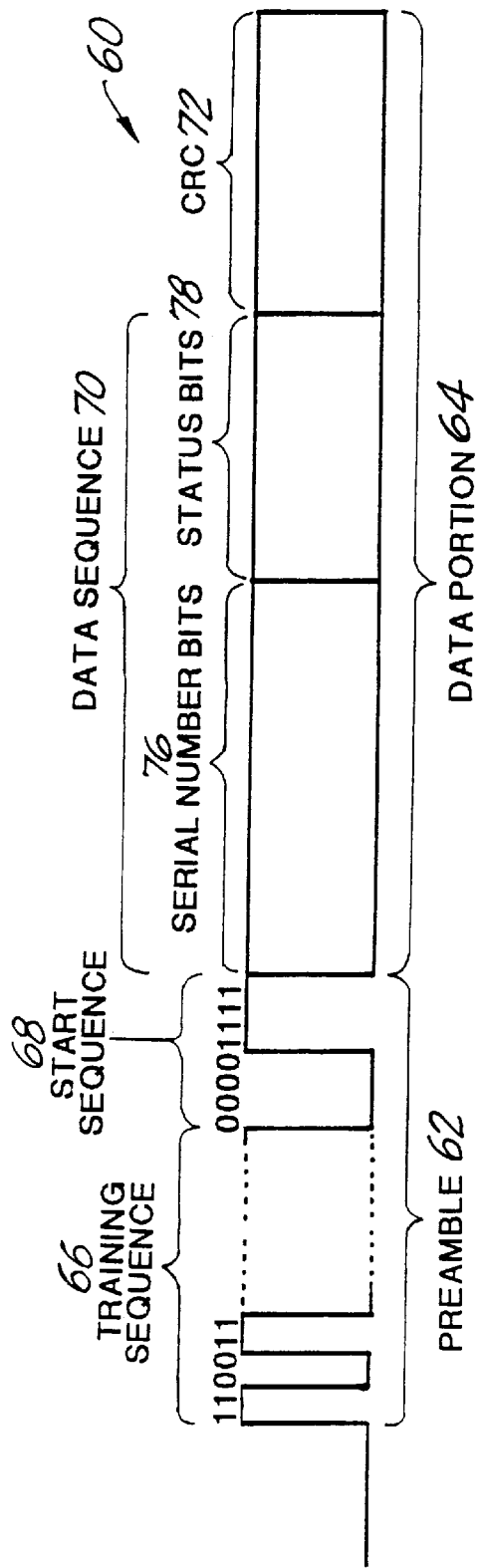
FIG. 2 illustrates a preferred embodiment of the inventive wireless signal.

FIG. 2 illustrates one type of wireless data signal 60 according to the present invention. A person skilled in the art recognizes that other signal structures are also possible. The structure of the signal 60 may be divided into two portions, the preamble 62 portion and the data portion 64. The data portion 64 data rate is faster, preferably about twice as fast, as the preamble 62 data rate. The reasons for this are made apparent below.

1. The Preamble Portion of the Signal

Figure 3:
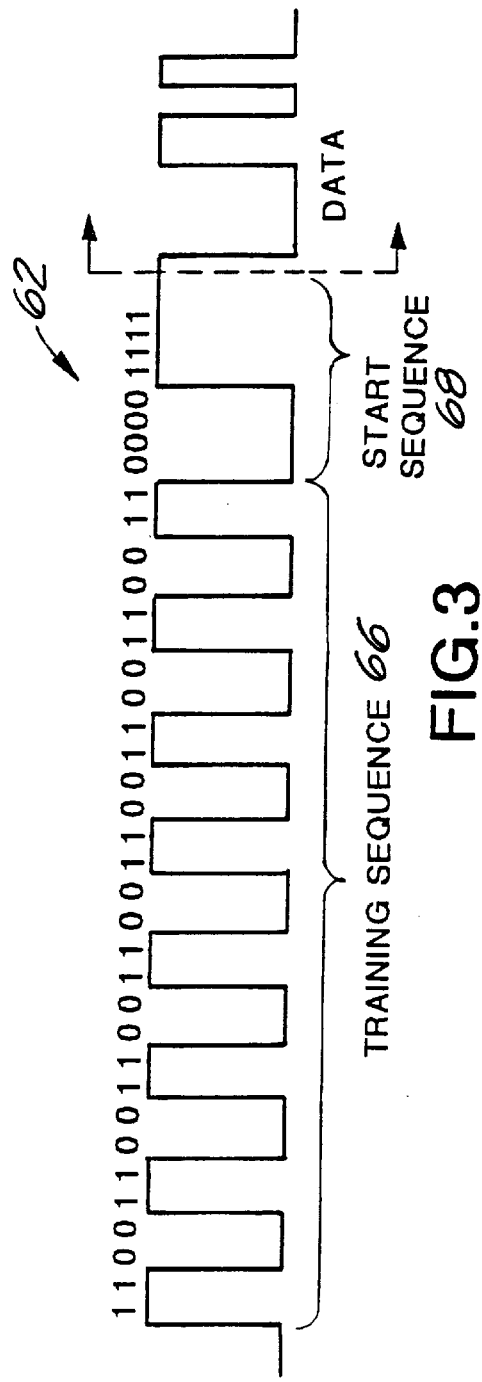
FIG. 3 illustrates a preferred embodiment of a preamble portion of the signal of FIG. 2.

The preamble 62 comprises two portions, the training sequence 66 and the starting sequence 68. The preamble 62 is shown in more detail in FIG. 3. In a preferred embodiment of the claimed invention, the training sequence 66 is a code at the beginning of a transmission which the receiver 52 will recognize as a transmitted signal. In the illustrative embodiment of FIG. 2, the training sequence 66 alternates between 0 and 1 for fifteen periods and at the preamble data rate. In a preferred embodiment, the preamble 62 data rate is one-half of the data portion data 64 rate, and the training sequence 66 may be considered to alternate between 00 and 11 for thirty periods at the data portion data rate. This training sequence allows the receiver 52 to prepare for the receipt of data, to reject noise, and to determine the strength of the incoming signal.

The training sequence 66 allows the receiver to prepare for incoming data to reject noise as follows. Whenever the receiver detects a leading or trailing edge of a transition between levels, (e.g., 0 to 1 or 1 to 0) it measures the period to the next edge. If the next edge occurs in an expected time (i.e., within a reasonable tolerance of the preamble data rate), the receiver is alerted that a data signal may be received. If a second edge is received within the expected time, its "confidence" that there is an incoming data signal increases and the receiver "locks onto" this frequency (i.e., the receiver stops scanning for incoming signals, as discussed below). If third and fourth edges having the same frequency are detected, it is virtually impossible that the edges are caused by noise. Thus, the training sequence 66 allows the receiver to prepare to receive the incoming data signal and to reject signals caused by noise.

Those skilled in the art recognize that detection of a valid preamble can be achieved by various methods. The illustrative example above, wherein data edges are timed, may be modified by requiring more or less edges, which has an associated effect on the probability of preamble detection. Other methods may also be used to detect the preamble, i.e., detection of received signal amplitude or auto-correlation techniques.

The training sequence 66 allows the receiver 52 to determine the strength of the incoming signal as follows. When the receiver 52 detects an edge having the appropriate frequency, it measures the signal level. Using this level, a center voltage for the signal is determined. This center voltage is used during reception of the data signal to determine if a bit is a 0 (i.e., it has a level below the center level) or a 1 (i.e., it has a level above the center level). Thus, with the signal strength determined, the receiver 52 can more accurately distinguish between a received 0 and 1, even in the presence of noise which may affect the voltage level of a 0 or a 1.

The starting sequence 68 is a combination of bits which indicate to the receiver 52 that data immediately follows. Those skilled in the art recognize that the starting sequence may be implemented by numerous combinations of bits, such as combinations of single or binary elements. A preferred starting sequence 68 is designed to allow the receiver to lock onto the transmitted signal and to change the pre- and post- detection bandwidths (discussed in detail below) and to allow the oscillator and baseband output in the receiver to settle. In a preferred embodiment, the starting sequence 68 includes two 0 bits followed by two 1 bits at the preamble 62 data rate (i.e., four 0 bits and four 1 bits at the data portion 64 data rate).

The data rate of the preamble 62 is preferably slower than the data rate of the data/CRC portion 64. In a preferred embodiment, the preamble bit rate is approximately 2.06 kbits/sec. In the preferred embodiment, the preamble data rate is half as fast as the data portion data rate. Thus, in the preferred embodiment, each 1 or 0 bit at the preamble data rate may be considered to be two consecutive 1 or 0 bits, respectively, at the data portion 64 data rate.

2. The Data Portion of the Signal

As illustrated in FIG. 2, the data portion 64 of the signal may include two portions. These two portions are the data sequence 70 and the CRC sequence 72.

The data sequence 70 contains the information to be transmitted. For example, the data may be serial number information 76 identifying the transmitting device and status information 78 such as an alarm condition report from a sensory device (i.e., smoke detector 30, motion sensor 32, or door alarm 36 of FIG. 1). In this preferred embodiment, the data portion comprises 32 bits (24 serial number bits; 8 status bits).

Figure 4:
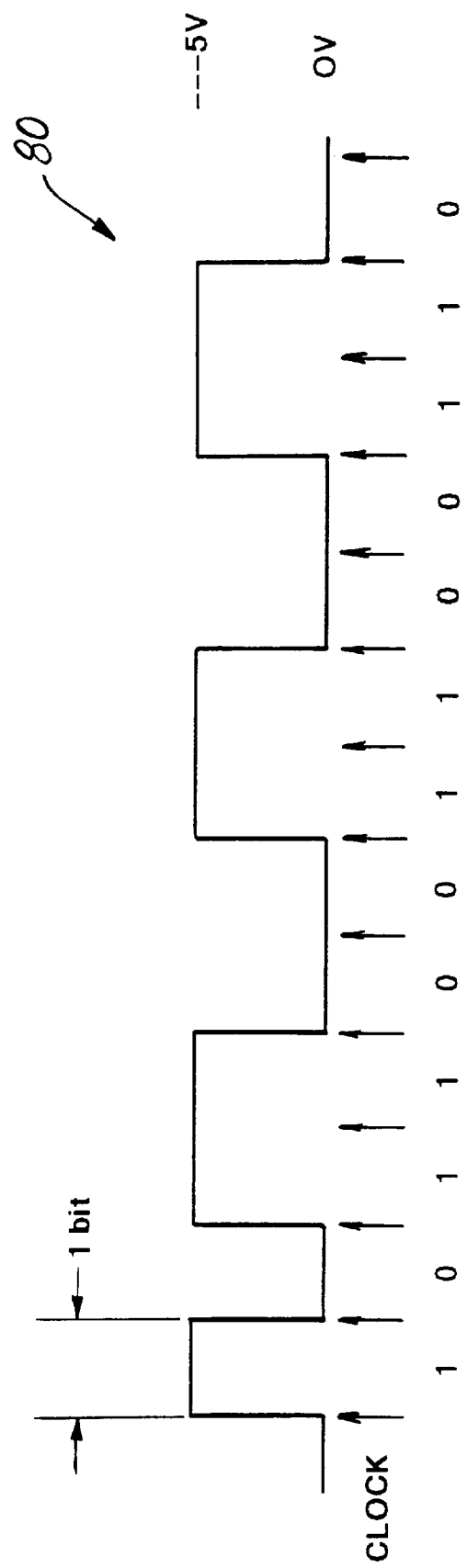
FIG. 4 illustrates a nonreturn-to-zero signal.

The data sequence 70 in this preferred embodiment is an NRZ baseband signal which modulates an RF signal for transmission using OOK-AM modulation. The data sequence 70 has no predetermined format and simply reflects the contents of the data. FIG. 4 illustrates an NRZ baseband signal 80. The NRZ signal 80 illustrated contains the following 13 bits: 1011001100110. Note that if the signal is represented as +5 V for a "1" and a 0 V for a "0", the signal is only "on" when the signal is "1".

Those skilled in the art recognize that the baseband signal which modulates the radio frequency signal for transmission may use coding other than NRZ provided that the average data rate is less than the Manchester clock rate. For example, delay modulation may also be used advantageously.

The CRC sequence 72 is a number of bits (in this illustrative embodiment, sixteen bits) which are appended to the data sequence 70. The CRC bits 72 are used by the receiver to check the integrity of the data sequence 70.

If the data sequence 70 and the CRC sequence 72 have more is than 0s, the data sequence of the signal may be inverted to ensure that the transmitted signal is "off" more than it is "on". A person skilled in the art appreciates that an inverted signal may be decoded in a number of ways. One way is to decode the entire signal, if the CRC bits do not compute, the receiver 52 inverts the received signal and decodes it again. Another way is to put one or more bits in the preamble or other part of the signal which will be detected by the receiver 52 indicating that the signal is inverted. This latter method may be disadvantageous because the additional bits lengthen the signal transmission time. This latter method may be advantageous, however, because it is more efficient for the receiver 52 to decode the signal only once.

The data rate of the data portion 64 is preferably faster than the preamble portion 62. In a preferred embodiment, the data portion 64 has a data rate of approximately 4.13 kbits/sec; which is twice as fast as a preferred data rate of the preamble 62.

3. The Advantages of the Inventive Signal Structure

The inventive signal structure has several advantages. One of these advantages is the "on" time versus the total signal length. A second advantage is that the low preamble data rate and higher data portion data rate overcome the inexpensive transmitter/sensitive, selective receiver conflicts. These advantages are discussed below.

The illustrative signal of FIG. 2 illustrates the advantageous timing of the preferred embodiment of the inventive signal structure. Within the United States, the 19 preamble bits (15 training sequence bits; 4 starting sequence bits) in this illustrative embodiment have a data rate of approximately 2.06 kbits/sec (a frequency of approximately 0.485 msec/bit); the 48 data/CRC bits (32 data bits, 16 CRC bits) have a data rate which is twice as fast, approximately 4.13 kbit/sec (a frequency of approximately 0.243 msec/bit). The total transmission time for this signal is approximately:

19 bits * 0.485 msec/bit (9.2 msec)+48 bits * 0.243 msec/bit (11.66 msec)=20.87 msec.

Note that the preamble has an effective rate of 38 bits at 0.243 msec. The entire transmission takes only about 21 msec seconds. Because the "on time" is never more than half the total signal time, the total "on time" is never more than approximately 10.43 msec. This is very near the ideal 10 msec "on time" for maximum power transmission.

In Europe, the regulatory agency does not have as stringent "on air" requirements as the United States. In this illustrative embodiment, the data rate is reduced as far as practical, until it does not adversely affect battery lifetime. The 19 preamble bits in this illustrative embodiment have a data rate of approximately 1.0325 kbits/sec, the 48 data/CRC bits have twice the data rate, approximately 2.065 kbit/sec. Thus, the total transmission time for this signal is:

19 bits * 0.968 msec/bit (18.4 msec)+48 bits * 0.484 msec/bit (23.23 msec)=41.63 msec.

Thus, the entire transmission takes only about 41.63 msec. Because the "on time" is never more than half the total signal time, the total "on time" is never more than 20.81 msec.

The lower preamble data rate and higher data portion data rate of the inventive transmission structure overcome the conflicts between the inexpensive transmitter/sensitive, selective receiver constraints. Consider the following illustrative example. In this example, a transmitter is configured to transmit at a frequency of 433.6738 Mhz. However, because of the inexpensive components used, in both the transmitter and receiver, the actual transmission frequency may be higher or lower than the receiver intermediate frequency, within a predictable margin. In this example, the actual transmission and reception intermediate frequency may be inaccurate by +/−17 kHz. For a receiver to receive the incoming signal, it should be able to receive frequencies at least between 433.6568 MHz and 433.6908 MHz. That is, the receiver should have a pre-detection filter with at least a 34 kHz bandwidth.

Once a signal having at least two properly timed edges of the preamble is detected, the receiver 52 "locks on" to the received frequency (i.e. stops scanning the possible transmit frequencies), this received signal is "mixed down" before the pre-detection filter to an intermediate frequency within the bandwidth range described (as will be described in more detail below). Because the preamble is a relatively low data rate, the signal, once received, may be filtered through a post-detection filter having a narrow bandwidth. This allows noise to be filtered out. Thus, the receiver may receive signals from inexpensive transmitters yet still be very selective and sensitive.

Those skilled in the art recognize that the detection of edges as an indication of a received signal is one example of many methods of detection of valid preamble. Other methods such as signal amplitude detection, auto-correlation, and counting and timing of a greater number of edges are also suitable.

By the time the training sequence and starting sequence have been processed, the transmission frequency has been "locked onto" and is driven to a predetermined intermediate frequency within a narrower bandwidth by the receiver 52. Thus, the pre-detection filter may be switched to having a narrower bandwidth, thus eliminating noise. The data portion data rate, however, is faster than the preamble and cannot be filtered through a narrow bandwidth post-detection filter. Thus, the post-detection filter may be switched to a wide bandwidth to handle the high data rate. Preferably, the filters are switched during the starting sequence 68 so that the filters are in place at the beginning of the data portion.

Thus, the inventive wireless data transmission structure overcomes the "on" time versus the total signal length and the inexpensive transmitter/sensitive, selective receiver conflicts.

B. The Transmitter Structure

Figure 1:
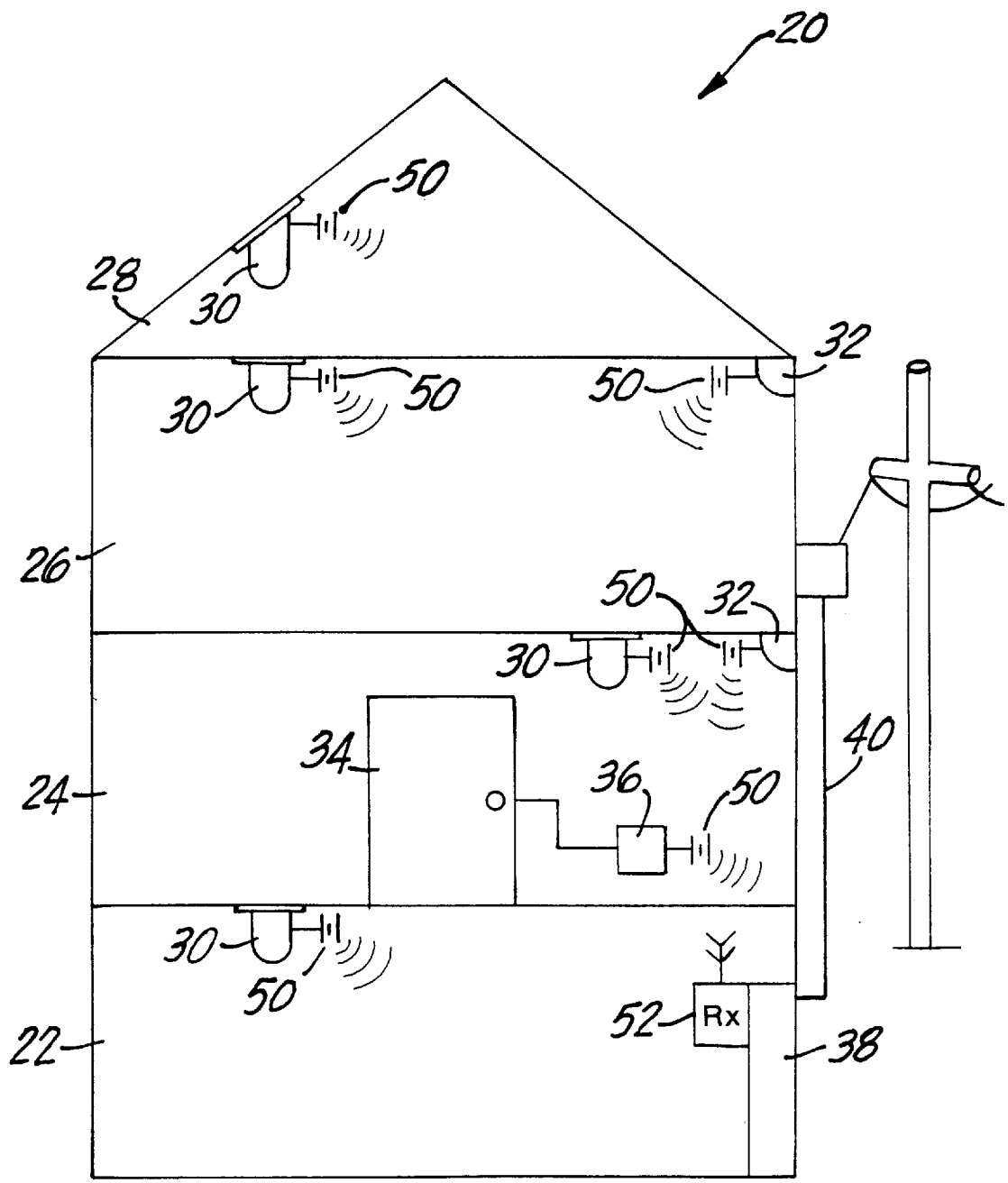
FIG. 1 illustrates a building having a wireless security system.
Figure 5:
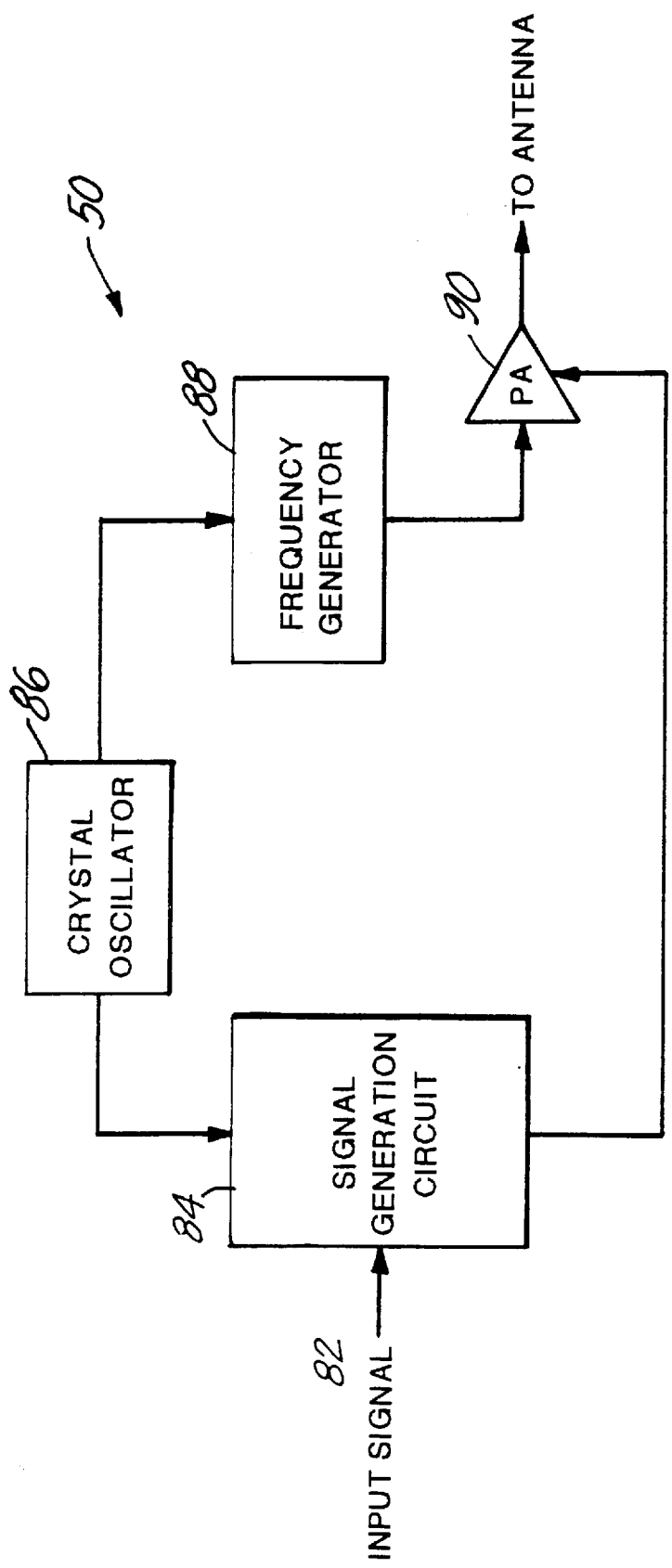
FIG. 5 is a block diagram of an illustrative embodiment of a wireless transmitter according to the present invention.

FIG. 5 is a block diagram of a wireless transmitter 50 according to one embodiment of the present invention. An input signal 82, such as a status or alarm signal in the wireless security system of FIG. 1, is applied to a signal generation circuit 84. The signal generation circuit 84 is clocked by a highly accurate timing device, such as a crystal oscillator 86 and generates a digital transmission signal, including the preamble portion 62, a data sequence 70, and a CRC sequence 72.

The crystal oscillator 86 also supplies the frequencies to a frequency generator 88, which preferably generates two or more radio transmission frequencies. These radio transmission frequencies are applied to a power amplifier 90. The power amplifier is turned on when the signal from the signal generation circuit 84 is high (i.e., when the signal is a logical "1"). When the amplifier 90 is turned on, it transmits the generated frequency to the antenna for broadcast. This provides an OOK-AM radio signal transmitted at the radio transmission frequency currently being applied to the power amplifier 90. The diverse transmission frequencies allow the signal to transmit alternately on different frequencies. This avoids multipath fading (i.e., if the paths of a transmission create cancellation (or nulls) at a first frequency, they should not create cancellation at a second frequency) and interference from other secondary signals which may be transmitted at or near one of the transmission frequencies in the vicinity of the receiver 52.

Moreover, because the signal generator 84 and the frequency generator 88 are both timed using the same highly accurate timing device, such as a crystal oscillator 86, the timing of the transmitted signal is improved over prior art transmitters which typically use RC oscillators, ceramic resonators, watch crystals, or other inaccurate time-keeping methods to generate the transmission frequency. This accurate timing allows a transmission signal that is not self clocked. Thus, for example a NRZ baseband, OOK-AM signal—which is not self clocked—may be advantageously used in the transmitter according to the present invention. The excellent data timing allows the NRZ signal to be used, and thus, benefit from efficient data rate of the NRZ signal. The improved data rate reduces the receiver bandwidth resulting in improved receiver sensitivity and selectivity without any "on air" time penalty.

Figure 6:
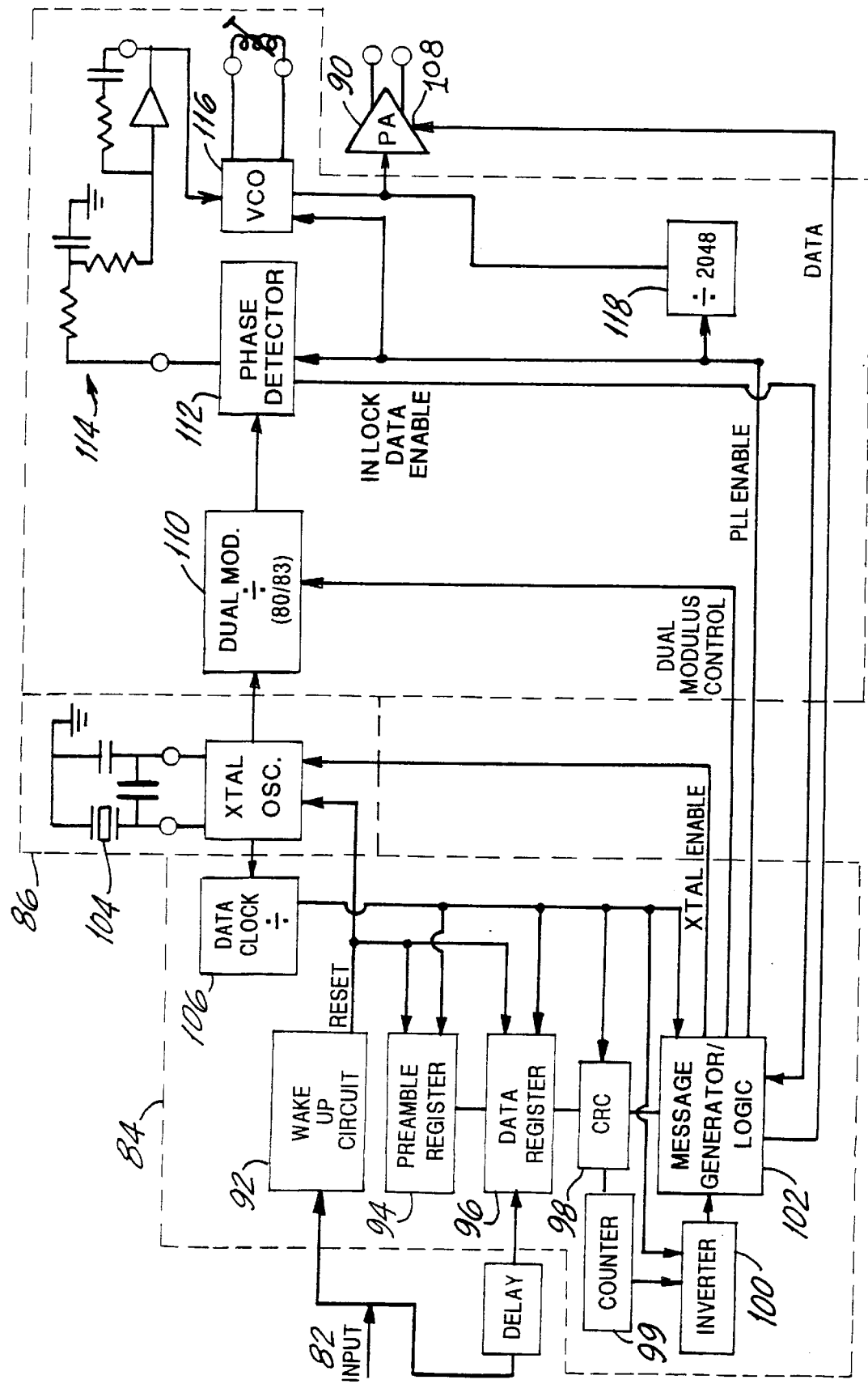
FIG. 6 is a more detailed block diagram of a preferred embodiment of the transmitter of FIG. 5.

FIG. 6 illustrates a preferred embodiment of the illustrative wireless transmitter 50 shown in FIG. 5. An input signal 82 is applied to the signal generation circuit 84. The signal generation circuit comprises a wake-up circuit 92, preamble register 94, data register 96, CRC computer 98, counter 99, data inverter 100, and message generator 102.

The wake-up circuit 92 receives the input signal 82 and resets the preamble register 94, data register 96 and powers up the crystal oscillator 86. In this illustrative embodiment, the crystal oscillator 86 is a crystal controlled reference oscillator having a crystal 104 which operates at 16.940383 MHz. This frequency is divided by a divider 106 to yield a clock signal. In this embodiment, the frequency is divided by 4098 to yield a data clock of approximately 4.1 kHz.

This 4.1 kHz clock signal is used by the preamble register 94, the data register 96, the CRC computer 98, the data inverter 100, and the message generator 102. These components assemble a transmission signal in the following manner. When an input signal is received, the wake-up circuit 92 resets the preamble register 94, which generates a preamble 62. The data register 96 is also reset and receives the input signal. Delays in the signal generation circuit 84 ensure that the data integrity is good (e.g., not erased by the reset). The data register 96 converts the signal into an NRZ baseband signal in the conventional manner. The NRZ baseband signal is appended to the preamble as the data sequence 70.

The combined signal is clocked through the CRC computer 98. After the CRC is appended, counter 99 determines whether the number of 1s in the data portion 64 exceeds the number of 0s, the signal is sent to the data inverter 100, if necessary. The data inverter 100 inverts the signal, resulting in a signal where the number of 0s exceed the number if 1s. (If the number of 1s and 0s are equal, the signal is not inverted.) The signal is now fully assembled. The assembled signal is fed to the modulation control switch 108 of the power amplifier 90. When a logical "1" is fed to the switch 108, the power amplifier is turned on, and the frequency applied to the amplifier 90 by the frequency generator 88 is transmitted.

The reference oscillator 86 also provides a 16.940383 MHz signal to the frequency generator 88. The frequency generator is preferably a variable frequency generator and comprises a dual modulus divider 110, a phase comparator 112, a loop filter 114, a voltage controlled oscillator (VCO) 116, and a fixed divider 118.

The reference frequency is divided by the dual modulus divider 110, which is controlled by control logic 102. The dual modulus divider 110 provides reference frequencies to the phase comparator 112. The low pass loop filter 114, the voltage controlled oscillator 116, and divider 118 form a phase-locked loop. The phase detector 112 generates an "in lock" signal to the message generator 102, indicating that the phase-locked loop has locked onto the proper frequency. The in-lock signal is a safety measure preventing transmission if the PLL fails to lock.

In this illustrative embodiment, the fixed divider 118 is set to 2048 and the dual modulus divider 110 is set to 80/83. This provides the power amplifier 90 with two diverse frequency outputs: 433.67378 MHz and 417.99880 MHz. These frequencies are derived as follows. The reference oscillator frequency 16.940383 MHz is divided by the dual modulus divider 110 to yield the following PLL reference frequencies:

$$16.940383/80 = 211.75478 \text{ kHz};$$

$$16.940383/83 = 204.10098 \text{ kHz}.$$

These PLL reference frequencies are then multiplied by the divider 118 division ratio:

$$211.75478 * 2048 = 433.67378 \text{ MHz};$$

$$204.10098 * 2048 = 417.99880 \text{ MHZ}.$$

The control logic in the message generator 102 causes the dual modulus divider 118 to change its modulus, thus changing the transmission frequency. The logic is preferably configured to transmit an entire signal at a first frequency and then repeat the same signal at a second frequency.

The VCO 116 output is applied to the power amplifier 90 which, when turned on by the data signal applied to the switch 108, sends the modulated, amplified signal to the antenna (not shown) for transmission.

Figure 7:
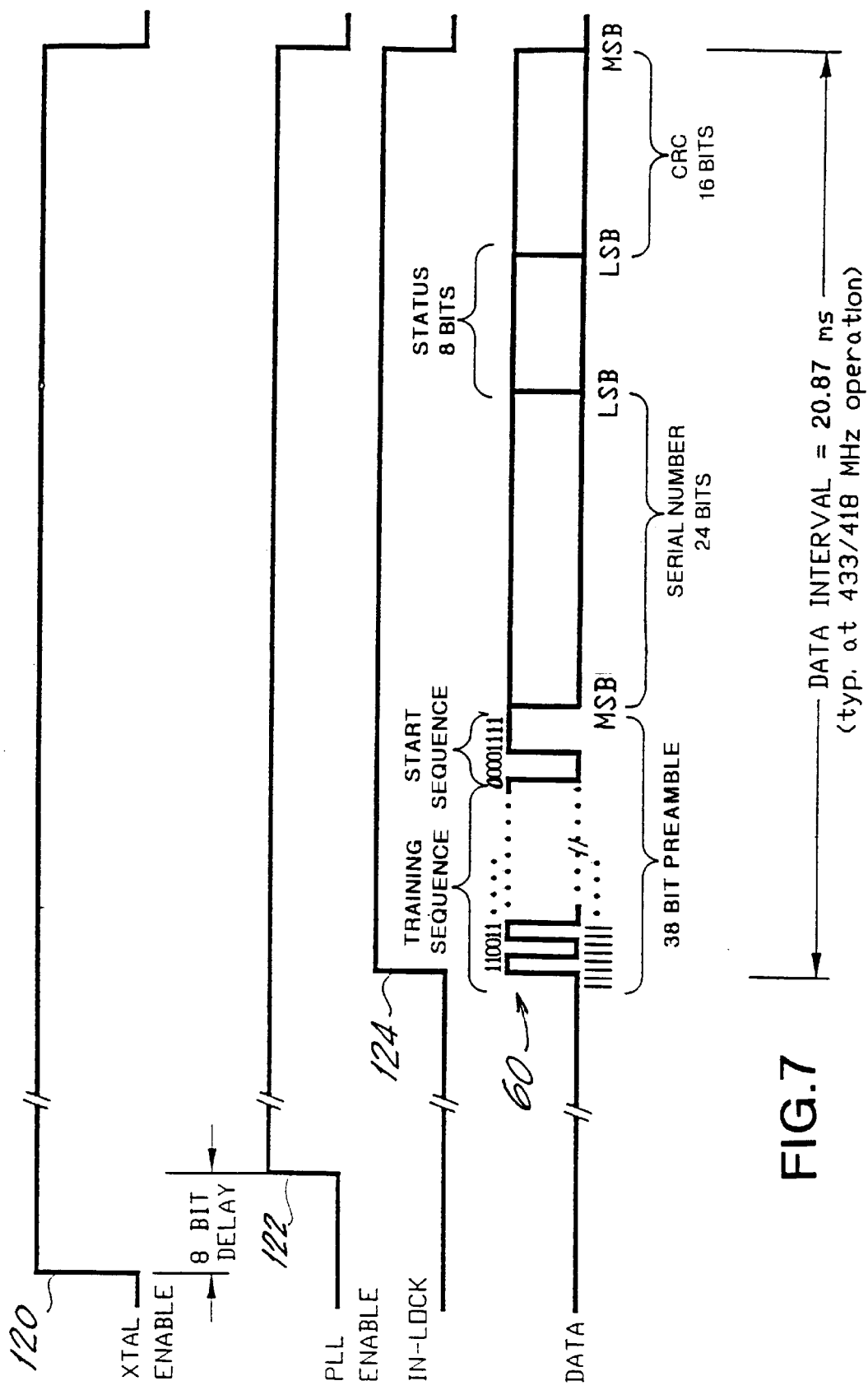
FIG. 7 is a timing diagram of several signals generated by the transmitter of FIG. 6.

FIG. 7 provides a timing diagram comparing a crystal enable signal 120, a phase-locked loop enable signal 122, an in-lock signal 124, and an illustrative transmission signal 60 having 86 data rate bits, which may be generated by the transmitter of FIG. 6.

The message generator 102 issues a crystal enable signal 120 when an input signal 82 is received. This signal enables the crystal reference oscillator, which has already been turned on by the wake up circuit 92. After an 8-bit delay to allow the crystal oscillator to settle before the transmission begins, the message generator 102 issues a phase-locked loop enable signal 122, which turns on the phase comparator 112, VCO 116, and fixed divider 118. The in-lock signal 124 is a safety signal which prevents transmission if the PLL fails to lock for any reason. The signal 60 is the signal applied to the switch 108 of the power amplifier 90. Note that the in-lock signal 124 is timed to correspond substantially with the signal 60. All of the signals terminate after the signal 60 has been applied to the power amplifier 90.

C. The Receiver Structure

Figure 8:
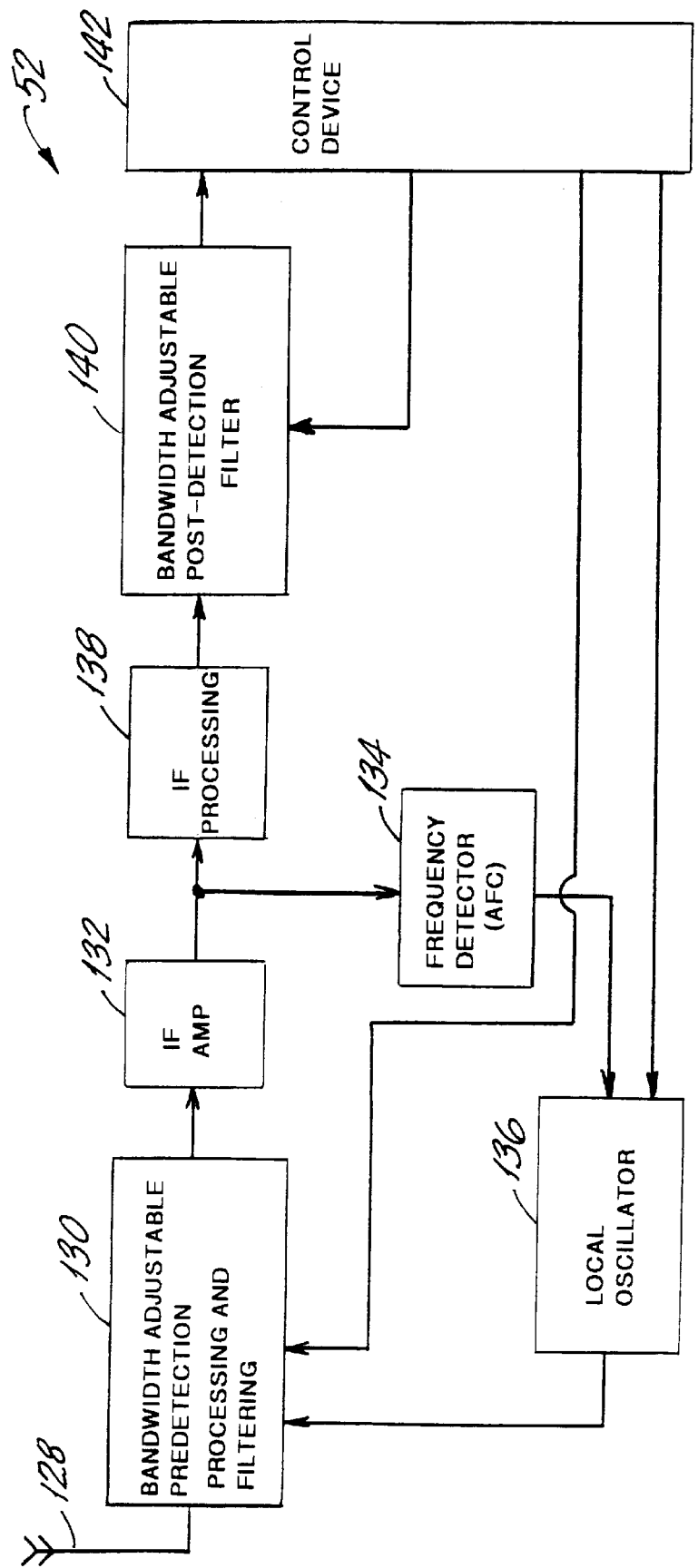
FIG. 8 is a block diagram of an illustrative embodiment of a receiver according to the present invention.

FIG. 8 illustrates a wireless receiver 52 according to the present invention. The receiver 52 is preferably an improved superheterodyne design, as will be described. The receiver 52 has an antenna 128, a pre-detection processing and adjustable bandwidth filter circuit 130, an intermediate frequency (IF) amplifier 132, a frequency detection circuit 134, a local oscillator 136, an IF processing circuit 138, an adjustable bandwidth post-detection filter 140, and a control device 142.

The receiver 52 has an antenna 128 for receiving transmitted signals. A received signal is applied to a pre-detection processing and bandwidth adjustable filtering circuit 130. This circuit processes the signal for use by the receiver 52 and filters the received signal using either a wide bandwidth filter or a narrow bandwidth filter, depending on the circumstances, as described above. The IF amp 132 amplifies the processed and filtered signal. The frequency of the processed signal is detected by the frequency detection circuit (or Automatic Frequency Control circuit) 134. The output of the frequency detection circuit 134 is used to control the output of the local oscillator 136. The local oscillator outputs a local oscillator frequency which affects the operation of the pre-detection processing and adjustable bandwidth filter circuit 130.

The output of the IF amplifier is applied to an IF processing circuit 138, which further processes the amplified signal. The output of the IF processing circuit 138 is applied to the bandwidth adjustable post-detection filter 140, which filters the processed IF signal using either a narrow bandwidth filter or a wide bandwidth filter, depending on the circumstances, as described above. The filtered, processed IF signal is received by a control device 142 for decoding. The control device 142 also generates signals which control the local oscillator 136, the post-detection filter 140, and the pre-detection filter circuit 130.

Figure 9:
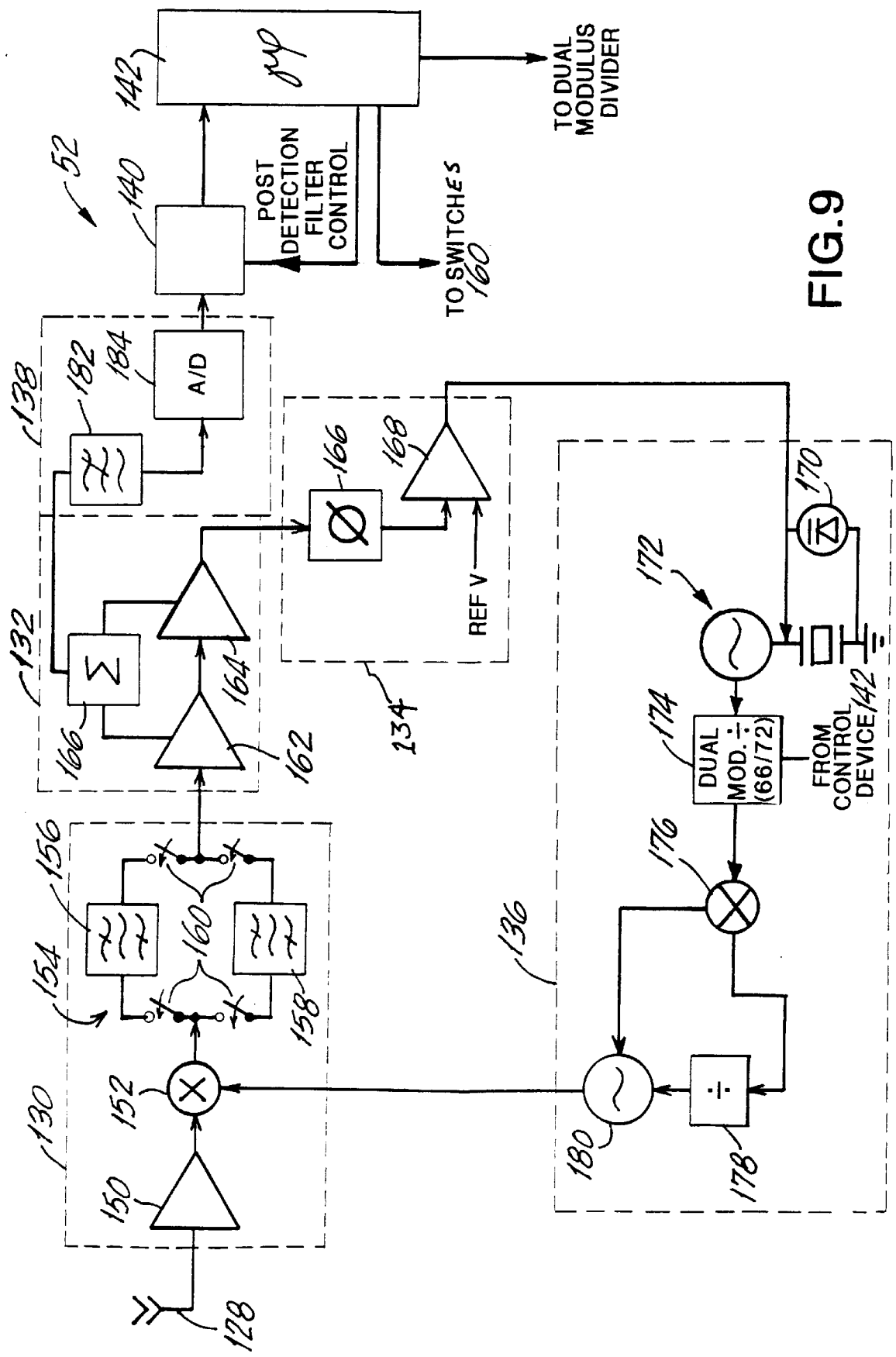
FIG. 9 is a more detailed block diagram of a preferred embodiment of the receiver of FIG. 8.

FIG. 9 illustrates a preferred embodiment of the illustrative receiver 52 shown in FIG. 8. The bandwidth adjustable pre-detection processing and filtering circuit 130 comprises a low noise amplifier 150, a mixer 152, and an adjustable pre-detection filter 154. A signal transmitted from, e.g., a wireless smoke detector 30 from FIG. 1, is received by the antenna 128. The signal is sent to the low noise amplifier 150 to be amplified to a level that may be used by the circuit. The amplified signal is then mixed with an output of the local oscillator 136 at the mixer 152 to produce an intermediate frequency which is approximately a center frequency of pre-detection filter 154, within a predetermined range, as described below.

The pre-detection filter 154 according to this illustrative embodiment comprises a wide bandwidth intermediate frequency filter 156 and a narrow bandwidth intermediate frequency filter 158. The appropriate filter 156, 158 is selected by switches 160, which are controlled by the control device 142. The bandwidth of the wide IF filter 156 is selected to have a bandwidth sufficient to pass any transmission signal taking into consideration any potential frequency error. For example, a crystal in an illustrative transmitter has a 10 part per million (ppm) accuracy and an additional 10 ppm variation due to operating temperature. Thus, at an illustrative operating frequency of 433 MHz, there is a possible maximum 4.33 kHz variation for accuracy and another possible 4.33 kHz variation due to temperature. At the receiver local oscillating frequency of 434.7 MHz there is a possible maximum 5 ppm variation for accuracy and 5 ppm variation due to temperature, resulting in possible variations of 2.17 kHz each for accuracy and temperature. The total possible variation is 12.9 kHz. The data side bands (i.e., the data rate) introduce an additional +/−4.1 kHz, for a total of approximately +/−17 kHz.

In this illustrative embodiment, the wide IF filter 156, which is switched in when the receiver is searching for a preamble, has a 34 kHz bandwidth. A person skilled in the art recognizes that an adjustable bandwidth filter may be implemented in a number of ways. For example, rather than two separate filters, a single filter having switchable or variable passive components may be used, or equivalent filters may be realized using well-known digital signal processing techniques to provide selectable filter bandwidths.

The post-detection filter 140, according to this illustrative embodiment, when searching for the preamble, preferably matches the preamble data rate of the incoming signal; in this illustrative embodiment, approximately 2.06 kbits/sec (approximately 1 kb/sec in Europe). This is the preferred bandwidth of the post-detection filter 140 of this illustrative embodiment during the periods when the receiver is scanning for signals. Those skilled in the art recognize that the adjustable post detection filter 140 may be implemented in a number of ways. For example, a single filter having switchable passive components may be used, or equivalent filters may be realized using well-known digital signal processing techniques to provide selectable filter bandwidths.

When the receiver is scanning for a preamble, the control device 142 generates an F1/F2 control signal, which is applied to a dual modulus divider 174. The dual modulus divider varies the local oscillator 136 output to search for incoming signals at each of the transmission frequencies, as described above. Note that in a preferred embodiment, the receiver's PLL (i.e., elements 134, 136) is constructed using the same components (i.e., integrated circuit chip) as the transmitter, but using a different crystal reference oscillator and division ratios.

The IF amplifier 132 receives the intermediate frequency from the bandwidth adjustable pre-detection processing and filtering circuit 130 and comprises a first amplifier 162, a second amplifier 164, and a summer 166.

In a preferred embodiment, the IF amp 132 is an industry standard integrated circuit chip, such as a Phillips NE604. The chip includes the amplifiers 162, 164 and a logarithmic received signal strength indicator (RSSI), i.e., summer 166. The RSSI is used as an OOK-AM detector. The logarithmic effect allows the dynamic range of the received signal from the transmitters located close to or far from the receiver to be very good. The output of the IF amp 132 is a detected envelope of an input signal at baseband.

The output of the second amplifier 164 is applied to the frequency detector 134. The components of the IF processor 138 are a low pass filter 182 and an analog-to-digital converter 184. The IF processor 138 is conventional and preferably comprises an anti-aliasing filter which is necessary for the subsequent analog-to-digital converter 184 and digital filter 140 to prevent aliasing. The analog-to-digital converter 184 samples the incoming baseband data and then digitally filters the digital information. The use of digital filters permits versatile filtering and simple, fast post-detection filter switching. A digital filter is also preferred because it has a nearly ideal response, whereas an analog baseband filter does not. Nevertheless, those skilled in the art recognize that analog filters and circuits followed by comparators, etc. could be used to implement a selectable bandwith filter.

The pre-detection processing and filtering circuit 130 and the IF processing circuit 138 determine the signal strength of the received signal. The analog-to-digital converter 184 continuously keeps a running noise average and detects received transitions due to noise. Because the training sequence is known to have a 50% duty cycle, the receiver can determine the signal strength.

When a preamble is recognized (e.g., by means of edges, amplitude, correlation, etc.), the frequency is "locked in", that is, the receiver stops scanning and switching local oscillator frequencies. The automatic frequency control (AFC) process begins. This process is performed by the frequency detector 134, preferably during the preamble starting sequence 68.

The frequency detector 134 comprises a frequency discriminator 166, such as a quadrature coil, zero-crossing detector, or other frequency-to-voltage converter, and a differential amplifier 168. The output voltage of the discriminator 166 is applied to the input of the differential amplifier 168. A reference voltage is applied to the other input of the amplifier 168. The output of the differential amplifier 168 is an error voltage which is applied to the local oscillator 136.

The error voltage is scaled in the differential amplifier 168 and applied to a varactor 170 in the receiver's reference oscillator 172. The error voltage causes the varactor 170 to "pull" the local oscillator frequency so that the receiver is essentially tuned to the frequency of the incoming message. This tends to drive the intermediate frequency towards the center frequency of the pre-detection filter and compensates for inaccuracies in the frequency of the transmitted signal and frequency of the receiver's local oscillator 136. The remaining components of the local oscillator, i.e., phase comparator 176, divider 178, and oscillator 180 are conventional are not described in detail here.

Towards the end of the start sequence 68, after the AFC process is completed and the receiver is tuned to the incoming frequency, the control device 142, preferably a microprocessor, such as Zilog Z89322 or equivalent, sends an IF filter control signal, which controls switches 160 in the pre-detection filter 154 to switch out the wide bandwidth IF filter 156 and switch in the narrow bandwidth IF filter 158. In this illustrative embodiment, the narrow bandwidth IF filter 158 preferably has half the bandwidth of the wide bandwidth IF filter 156, i.e., +/−7.5 kHz, in part because the transmitter inaccuracies are eliminated by the AFC process. This filter switch results in improved receiver selectivity and reduces the receiver's noise floor. In the illustrative embodiment, this is a 6 dB improvement.

Also towards the end of the start sequence, the control device 142 sends a post-detection filter control signal to the post-detection filter 140. This signal increases the post-detection filter 140 bandwidth to properly handle the data portion of the incoming signal. In the illustrative embodiment described here, the bandwidth is increased from approximately 2.06 kbits/sec to approximately 4.13 kbits/sec.

Figure 10:
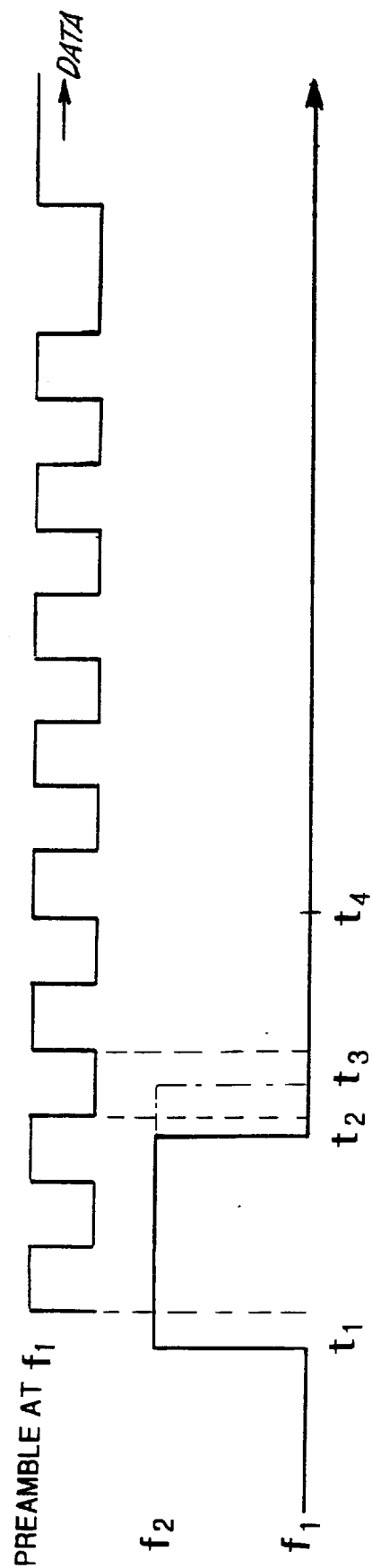
FIG. 10 is a diagram illustrating the reception of a transmitted signal by the receiver of FIG. 9.

FIG. 10 illustrates the operation of the receiver 52. At time $t_0$, the receiver is scanning for an incoming signal at a first frequency F1. That is, the F1/F2 control signal instructs the dual modulus divider 174 to divide the local oscillator frequency so that an incoming signal having the first frequency will be driven to the center frequency of the wide IF filter 156. No signal is being transmitted, at this time thus no signal is detected.

At time $t_1$, the receiver switches to the second frequency. No signal is being transmitted at F2, so again, no signal is detected. At time $t_2$, the receiver returns to F1. The local oscillator, however, does not settle into the proper frequency until time $t_3$ (this settling time is slightly exaggerated in FIG. 10 for illustrative purposes). Thus, the transition occurring between $t_2$ and $t_3$ is not detected. The first edge occurring after $t_3$ is detected. The receiver detects several more edges at F1 and the receiver "locks onto" the incoming signal. At time $t_4$, the receiver is receiving the incoming signal and therefore does not switch back to F2.

Note that the receiver switches between F1 and F2 much faster than the transmitter switches between F1 and F2. Thus, there are several possible scans of both F1 and F2 during each preamble. In the preferred embodiment, each receiver's scanning period is long enough to receive three bits at the preamble data rate of the training sequence. Of course, once the receiver detects a proper training sequence pattern, it "locks on" to the signal and does not switch the other frequency. Note that if reception at F1 is not possible because of multipath fading, the entire 86 bit transmission is repeated twice at F1 and twice at F2 to ensure reception in the multipath environment. The optimal data encoding efficiency of the present invention minimizes the inefficiency of multipath solutions.

The present invention is not limited to the disclosed embodiment, but rather various modifications, substitutions, and structures may be used without departing from the scope of the present invention.

I claim:

1. A method of generating and receiving in a wireless transmission system, comprising the steps of:
   a. generating a preamble, said preamble having a first bit rate;
   b. generating a data portion, said data portion having a second, higher bit rate;
   c. appending the data portion to the preamble to create a signal;
   d. modulating a radio frequency with the signal; and
   e. enabling a wireless receiver to select a wide bandwidth pre-detection filter and a narrow bandwidth post-detection filter during reception of the preamble and a narrow bandwidth pre-detection filter and a wide bandwidth post-detection filter during reception of the data portion.

2. The method of claim 1, wherein the data portion comprises digital data and further comprising before the step of modulating:
   a. determining if the data portion contains more 1s than 0s; and
   b. if the data portion is determined to have more 1s than 0s, inverting the data portion.

3. The method of claim 1, wherein the step of generating the preamble comprises the steps of:
   a. generating a training sequence, said preamble comprising said training sequence; and
   b. generating a starting sequence; said preamble comprising said starting sequence.

4. The method of claim 1, wherein the step of generating the data portion comprises:
   a. generating a data sequence, said data portion comprising said data sequence;
   b. generating a cyclical redundancy check (CRC) sequence; and
   c. appending the CRC sequence to the data sequence.

5. The method of claim 4, wherein the step of generating the data sequence comprises generating a nonreturn to zero signal.

6. The method of claim 4, wherein the step of generating the data sequence comprises generating a delay modulation signal.

7. The method of claim 1, wherein the step of generating the data portion comprises generating the data portion at a bit rate twice the preamble bit rate.

8. The method of claim 1, wherein the step of modulating comprises the step of on-off key amplitude modulating the signal.

9. A wireless transmission system, comprising:
   a signal comprising
   a. a preamble having a first data rate; and
   b. a digital data portion appended to the preamble, said data portion having a second data rate, the second data rate being higher than the first data rate, the different data rates enabling a wireless receiver to select a wide bandwidth pre-detection filter and a narrow bandwidth post-detection filter during reception of the preamble and a narrow bandwidth pre-detection filter and a wide bandwidth post-detection filter during reception of the data portion, the digital data portion being configured to have no more 1s than 0s regardless of content of the digital data portions.

10. The wireless transmission system of claim 9, wherein the preamble comprises:
    a. a training sequence having a first predetermined pattern of bits configured so a receiver will identify the preamble as an incoming signal, said preamble comprising said training sequence; and
    b. a starting sequence having a second predetermined number of bits appended to the training sequence configured to indicate to the receiver that the data portion immediately follows, said preamble comprising said starting sequence.

11. The wireless transmission system of claim 10, wherein the training sequence comprises a repeating sequence of a 1 followed by a 0 at the first data rate.

12. The wireless transmission system of claim 9, wherein the second data rate is twice the first data rate.

13. The wireless transmission system of claim 12, wherein the training sequence is equal to a repeating sequence of two is followed by two 0s at the second data rate.

14. The wireless transmission system of claim 10, wherein the starting sequence comprises a single pattern of is and 0s.

15. The wireless transmission system of claim 10, wherein the starting sequence comprises at least one of a plurality of 0s and a plurality of 1s.

16. The wireless transmission system of claim 9, wherein the data portion comprises:
    a. a data sequence, said data portion comprising said data sequence; and
    b. a cyclical redundancy check sequence appended to the data sequence and being configured to check the integrity of the data sequence.

17. The wireless transmission system of claim 9, wherein the signal is modulated by on-off keyed amplitude modulation.

18. A wireless signal system, comprising:
    a. a crystal oscillator
    b. a frequency generator responsive to the crystal oscillator and configured to provide at least one radio frequency to a power amplifier;
    c. the power amplifier configured to receive the at least one radio frequency from the frequency generator and being configured to receive a digital transmission signal, the amplifier transmitting the radio frequency at times when the digital transmission signal presents a 1 to the amplifier; and
    d. a signal generation circuit, responsive to the crystal oscillator and configured to receive an input signal and to output the digital transmission signal, said signal generator configured to generate a preamble of the digital transmission signal at a first bit rate and a data portion of the digital transmission signal at a second bit rate, the different data rates enabling a wireless receiver to select a wide bandwidth pre-detection filter and a narrow bandwidth post-detection filter during reception of the preamble and a narrow bandwidth pre-detection filter and a wide bandwidth post-detection filter during reception of the data portion.

19. The wireless signal system of claim 18, wherein the signal generation circuit comprises:
   a. a preamble register responsive to the crystal oscillator and configured to generate said preamble of the digital transmission signal;
   b. a data register connected to the preamble register responsive to the crystal oscillator and to the input signal, and configured to generate said data portion of the digital transmission signal;
   c. a cyclical redundancy check (CRC) register connected to the data register, responsive to the crystal oscillator, and configured to generate a CRC portion of the digital transmission signal;
   d. a counter connected to the CRC register to determine whether the number of is exceeds the number of 0s in the data and CRC portions;
   e. a data inverter connected to the counter, responsive to the crystal oscillator, and configured to invert the data and CRC portions of the digital transmission signal if the number of is exceeds the number of 0s in the data and CRC portion; and a message generator configured to output the digital transmission signal.

20. The wireless signal system of claim 18, wherein the frequency generator is a variable frequency generator configured to output a plurality of radio frequencies.

21. The wireless signal system of claim 18, wherein the frequency generator includes a dual modulus divider responsive to the signal generation circuit, and configured to vary the radio frequency.

22. A wireless signal receiver, comprising:
   a. an automatic frequency control (AFC) circuit responsive to a processing circuit and configured to generate an AFC signal;
   b. a bandwidth adjustable pre-detection processor responsive to the AFC signal and configured to receive a wireless signal and configured to have a first bandwidth at times when the receiver is scanning for a signal and to have a second, narrower bandwidth at times when a signal is received and having an output;
   c. the processing circuit connected to receive the bandwidth adjustable pre-detection processor output;
   d. a bandwidth adjustable post-detection filter connected to the processing circuit and configured to have a third, narrow bandwidth at times when a preamble of the signal is received and to have a fourth bandwidth wider than the third bandwidth when a data portion of the signal is received; and
   e. a control device for decoding the signal.

23. The wireless signal receiver of claim 22, wherein the AFC circuit further comprises:
   a. frequency detector circuit responsive to the processing circuit and configured to generate an error voltage; and
   b. a local oscillator responsive to the error voltage and configured to generate the AFC signal.

24. The wireless signal receiver of claim 23, wherein the frequency detector circuit comprises:
   a. a discriminator connected to the processing circuit and configured to generate an output voltage; and
   b. a differential amplifier configured to receive the discriminator output voltage and a reference voltage, and configured to generate the error voltage.

25. The wireless signal receiver of claim 23, wherein the local oscillator further comprises a dual modulus divider responsive to the control device, the dual modulus divider being configured to alter a frequency of the local oscillator.

26. The wireless signal receiver of claim 22, wherein the bandwidth adjustable pre-detection processor comprises:
   a. a mixer responsive to the AFC signal and configured to receive the wireless signal and to mix the received wireless signal to an intermediate frequency; and
   b. an adjustable pre-detection filter responsive to the control device to switch between the first and second bandwidths.

27. The wireless signal receiver of claim 22, wherein the post-detection filter is configured to be responsive to the control device to switch between the third and fourth bandwidths.

28. A method of wireless communication, comprising the steps of:
   a. transmitting a wireless signal having a preamble portion comprising a training sequence and a start sequence, the preamble portion having a first data rate, and a data portion having a second data rate, the second data rate being higher than the first data rate;
   b. receiving the wireless signal, wherein:
      (i) during reception of the training sequence;
         (1) receiving the preamble at a receiver;
         (2) mixing the received preamble to an intermediate frequency;
         (3) selecting a pre-detection filter, which receives the intermediate frequency, to have a wide bandwidth; and
         (4) selecting a post-detection filter, which receives the filtered intermediate frequency, to have a narrow bandwidth;
      (ii) during reception of the starting sequence:
         (1) selecting the pre-detection filter to have a narrow bandwidth; and
         (2) selecting the post-detection filter to have a wide bandwidth; and
      (iii) during reception of the data portion of the signal;
         (1) receiving the data portion at the receiver; and
         (2) mixing the received data portion to the intermediate frequency; and
         (3) decoding the data portion at the control device.

29. The method of claim 28, wherein the step of transmitting comprises transmitting the signal at a plurality of transmission frequencies.

30. The method of claim 29, wherein the step of mixing further comprises adjusting a mixing frequency at predetermined time intervals to mix each of the plurality of transmission frequencies to the intermediate frequency.

31. The method of claim 28, further comprising the steps of:
   a. during reception of the training sequence:
      (i) converting the intermediate frequency into a voltage;
      (ii) comparing the voltage to a reference voltage; and
      (iii) generating an error voltage based on the comparison;
   b. during reception of the start sequence:
      (i) adjusting a mixing frequency according to the error voltage; and
      (ii) mixing the received signal to the intermediate frequency using the adjusted mixing frequency.

32. The method of claim 28, further including before the step of transmitting the preamble and the data portions, on-off key amplitude modulating the signal.

* * * * *